(12) United States Patent
Hirotomi et al.

(10) Patent No.: US 7,665,584 B2
(45) Date of Patent: Feb. 23, 2010

(54) DISC ROTOR RETAINING ASSEMBLY

(75) Inventors: Shinya Hirotomi, Osaka (JP); Takanori Kanehisa, Osaka (JP); Yuzuru Uchiyama, Osaka (JP)

(73) Assignee: Shimano Inc., Sakai, Osaka (JP)

( * ) Notice: Subject to any disclaimer, the term of this patent is extended or adjusted under 35 U.S.C. 154(b) by 712 days.

(21) Appl. No.: 11/406,476

(22) Filed: Apr. 17, 2006

(65) Prior Publication Data

US 2007/0240945 A1    Oct. 18, 2007

(51) Int. Cl.
*B60T 1/06*   (2006.01)
(52) U.S. Cl. .................. 188/18 A; 188/26; 188/218 XL
(58) Field of Classification Search ............... 188/18 A, 188/26, 218 XL
See application file for complete search history.

(56) References Cited

U.S. PATENT DOCUMENTS

| | | | | |
|---|---|---|---|---|
| 3,542,166 | A  * | 11/1970 | Harrison ............... | 188/218 XL |
| 5,810,123 | A  * | 9/1998 | Giorgetti et al. ...... | 188/218 XL |
| 6,247,562 | B1 * | 6/2001 | Gotti et al. ............ | 188/218 XL |
| 6,371,252 | B1 | 4/2002 | Kanehisa | |
| 6,854,569 | B2 * | 2/2005 | Chen ........................... | 188/26 |
| 6,964,323 | B2 * | 11/2005 | Campbell .................. | 188/18 A |
| 7,143,872 | B2 * | 12/2006 | Takizawa ..................... | 188/26 |
| 7,374,023 | B2 * | 5/2008 | Yamamoto, Shusuke .. | 188/18 A |
| 2003/0000779 | A1* | 1/2003 | Kanehisa ..................... | 188/19 |
| 2004/0182654 | A1 | 9/2004 | Chen | |
| 2005/0139431 | A1 | 6/2005 | Takizawa | |
| 2005/0139432 | A1 | 6/2005 | Takizawa | |

FOREIGN PATENT DOCUMENTS

| | | |
|---|---|---|
| DE | 20200401658 U1 | 2/2005 |
| DE | 202005009504 U1 | 11/2005 |
| DE | 202006000549 U1 | 3/2006 |
| EP | 1288117 A2 | 3/2003 |
| EP | 1548317 A | 6/2005 |
| EP | 1548318 A | 6/2005 |
| EP | 1634725 A | 3/2006 |
| FR | 2783491 A1 | 3/2000 |
| JP | 61241538 A  * | 10/1986 |
| JP | 63280937 A  * | 11/1988 |
| WO | WO 03100281 A1 * | 12/2003 |

OTHER PUBLICATIONS

European Search Report dated Oct. 2, 2008 for EP 06 25 5559.

* cited by examiner

*Primary Examiner*—Thomas J Williams
(74) *Attorney, Agent, or Firm*—Jeffer Mangels Butler & Marmaro LLP (57) ABSTRACT

An apparatus for coupling a bicycle disc brake rotor to a bicycle wheel hub is disclosed. The apparatus includes an adapter and a rotor retaining member. The adapter is adapted to be nonrotatably coupled to the bicycle wheel hub and to be nonrotatably coupled to the disc brake rotor. The adapter includes a plurality of axially extending protruding portions adapted to extend through the disc brake rotor to nonrotatably couple the disc brake rotor to the adapter. At least one of the protruding portions has a groove defined therein. A portion of the rotor retaining member is received in the groove in the protruding portion.

12 Claims, 10 Drawing Sheets

DISC ROTOR RETAINING ASSEMBLY

FIELD OF THE INVENTION

The present invention relates to bicycles and, more particularly, to an apparatus for retaining a bicycle disc brake rotor to a bicycle wheel hub.

BACKGROUND OF THE INVENTION

Cycling has gained widespread acceptance not only as a means of transportation but also as a form of recreation. In fact, both amateur and professional bicycle racing has become extremely popular. As a result of these factors, the bicycle industry is constantly making improvements to various bicycle parts, whether they are used in bicycles for recreation, transportation, or racing. Bicycle braking systems in particular have undergone wide-ranging redesigns over the past few years.

Several types of bicycle braking devices are available on the market. Such devices include rim brakes, caliper brakes, disc brakes, and other general bicycle braking devices. Disc brake systems usually are the braking systems of choice when the rider requires a very high-performance braking system. That is because disc brake systems confer a very large amount of control relative to the force of operation applied to the brake lever, and they generally are very robust under any weather or riding condition.

Disc brake systems normally comprise a caliper connected to the bicycle frame, a brake lever attached to the bicycle handlebar for operating the caliper, and a disc brake rotor securely connected to the bicycle wheel hub. Several different methods are used for connecting the disc brake rotor to the wheel hub. A common method is to bolt the disc brake rotor to an adapter using, e.g., three to eight bolts, wherein the adapter is attached to the wheel hub. Of course, such a method requires each bolt to be attached and tightened separately, thus requiring significant effort during the manufacturing process and degrading manufacturing efficiency.

Thus, a need has arisen for a way to secure a disc brake rotor to a bicycle wheel hub without having to tighten a plurality of separate bolts.

SUMMARY OF THE PREFERRED EMBODIMENTS

In accordance with one aspect of the present invention, there is provided an apparatus for coupling a bicycle disc brake rotor to a bicycle wheel hub. The apparatus includes an adapter and a rotor retaining member. The adapter is adapted to be nonrotatably coupled to the bicycle wheel hub and to be nonrotatably coupled to the disc brake rotor. The adapter includes a plurality of axially extending protruding portions adapted to extend through the disc brake rotor to nonrotatably couple the disc brake rotor to the adapter. At least one of the protruding portions has a groove defined therein. A portion of the rotor retaining member is received in the groove in the protruding portion. In a preferred embodiment, at least two of the protruding portions have a groove defined therein, and a portion of the rotor retaining member is received in each of the grooves.

In accordance with another aspect of the present invention, there is provided an apparatus for coupling a bicycle disc brake rotor having a plurality of openings defined therein to a bicycle wheel hub. The apparatus includes an adapter and an annularly shaped rotor retaining member. The adapter includes a plurality of axially extending protrusions adapted to extend through the openings in the disc brake rotor, and the rotor retaining member engages the protrusions to couple the disc brake rotor to the adapter. In a preferred embodiment, the rotor retaining member is elastically deformable.

In accordance with yet another aspect of the present invention, there is provided an apparatus for coupling a bicycle disc brake rotor to a bicycle wheel hub that includes an adapter formed integrally with the hub, and a rotor retaining member. The adapter includes a plurality of axially extending protruding portions adapted to extend through the disc brake rotor to nonrotatably couple the disc rotor to the hub. At least one of the protruding portions has a groove define therein, and a portion of the rotor retaining member is received in the at least one groove.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
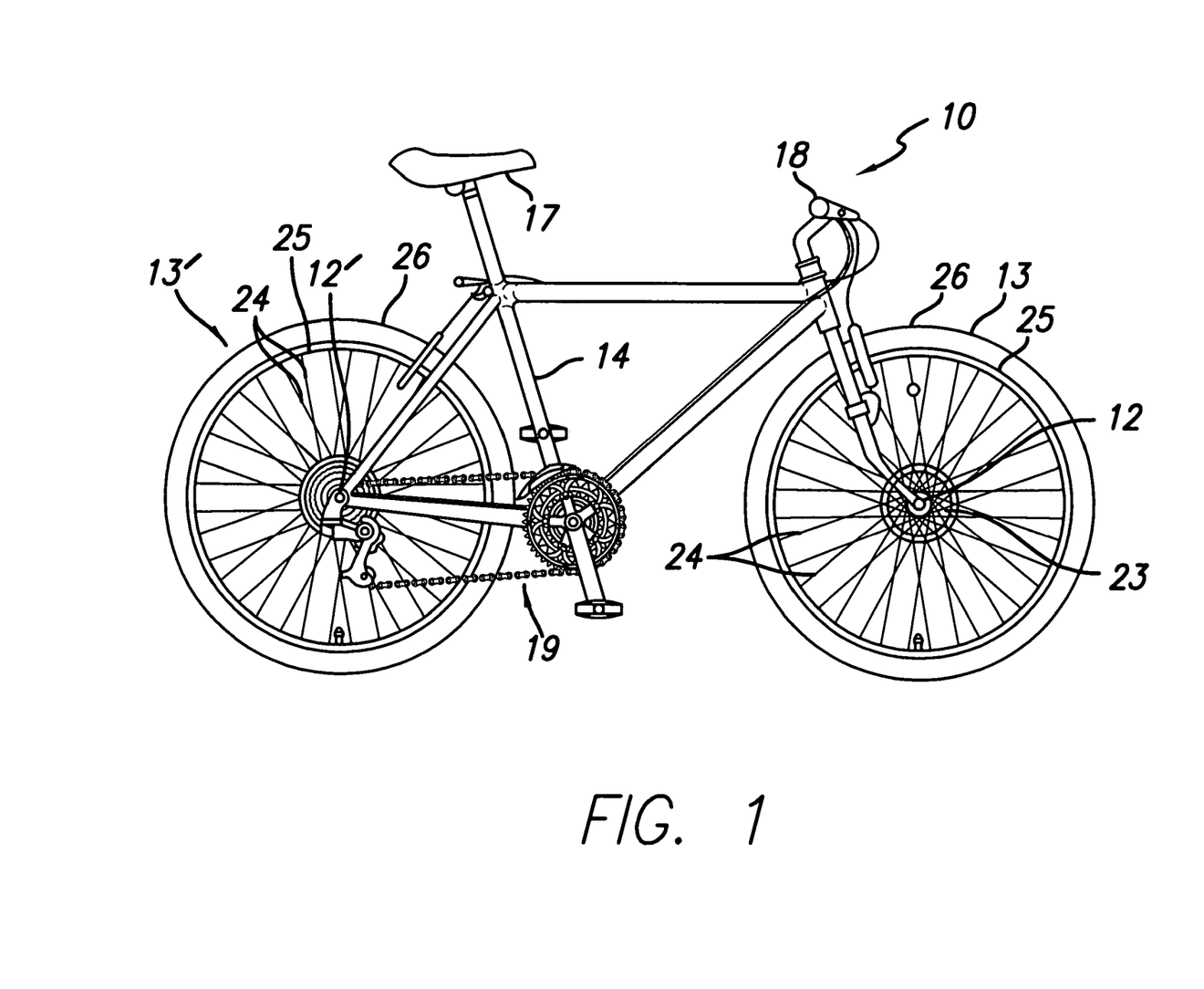
FIG. 1 is a side view of a bicycle having front and rear disc brake hubs in accordance with an embodiment of the invention.

FIG. 1 is a side view of a particular embodiment of a bicycle 10. Bicycle 10 comprises a frame 14, a front wheel 13 rotatably connected to a front fork of frame 14 through a front disc brake hub 12, a rear-wheel 13' rotatably connected to the rear portion of frame 14 through a rear disc brake hub 12', a seat 17 adjustably connected to frame 14, handlebars 18 connected to the front fork for rotating front wheel 13, and a drive train 19 for propelling the bicycle 10. A plurality of spokes 24 extend outwardly from the front and rear disc brake hubs 12 and 12', and the outer ends of spokes 24 are fastened to a rim 25 with spoke nipples (not shown) in a conventional manner. A tire 26 is disposed on the outer circumference of each rim 25. Bicycle 10 and its various parts are well known, so a description thereof shall be omitted, except for the components comprising the front and rear disc brake hubs 12 and 12'. Other components such as other brakes, derailleurs, additional sprockets, etc. may be used with bicycle 10.

Figure 2:
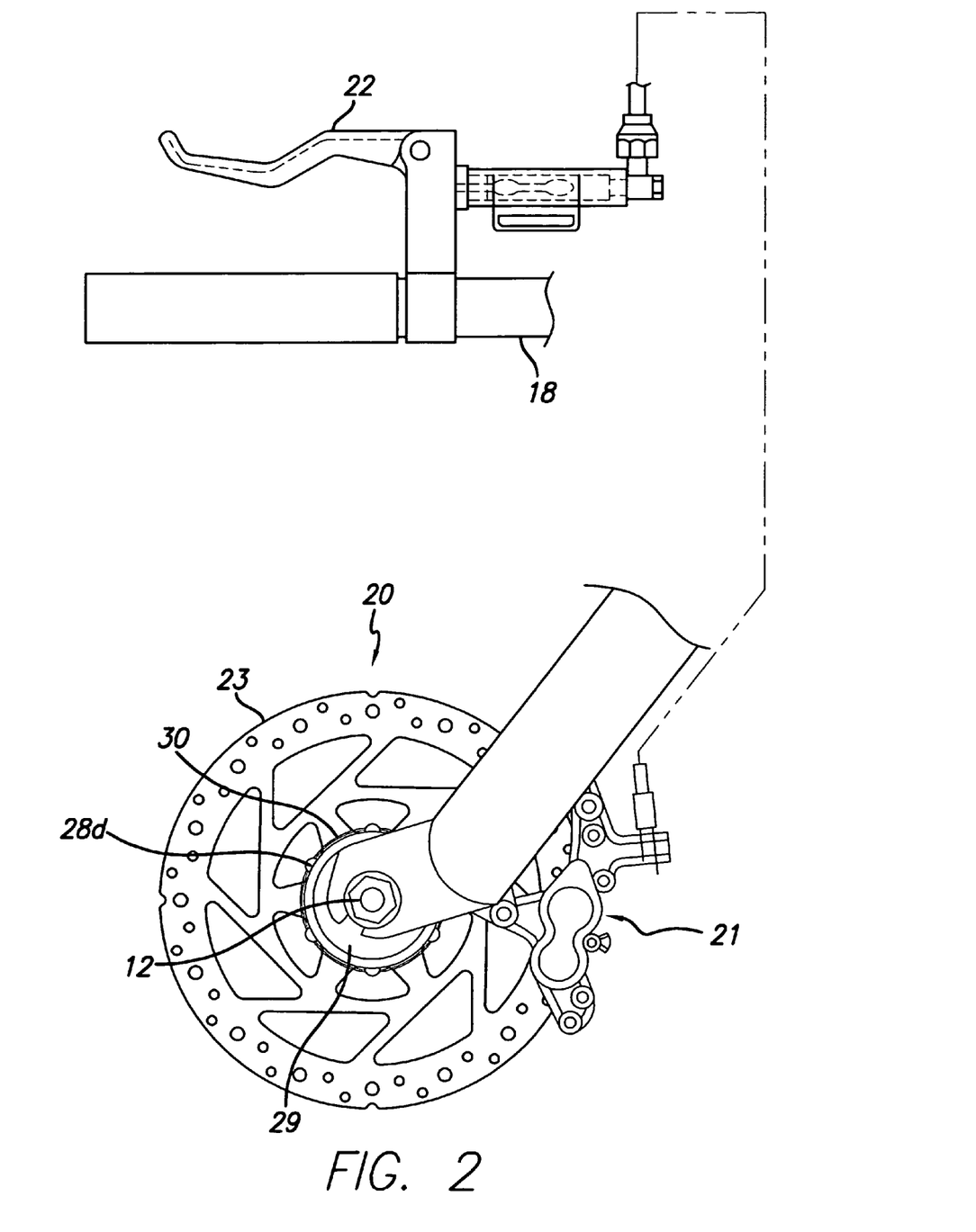
FIG. 2 is a view of relevant components for a front disc brake system.
Figure 3:
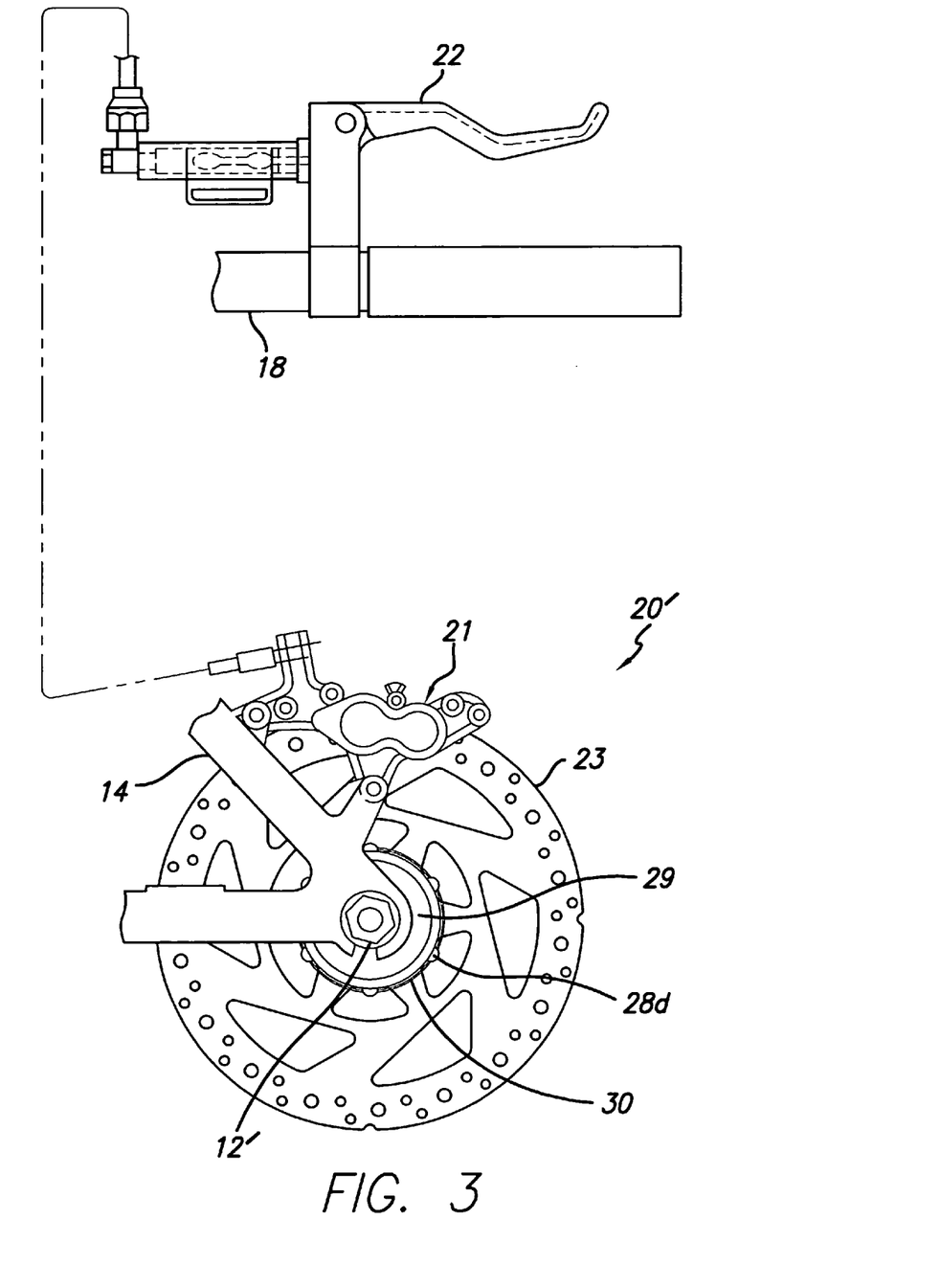
FIG. 3 is a view of relevant components for a rear disc brake system.

As shown in FIGS. 2 and 3, bicycle 10 further comprises front and rear disc brake assemblies 20 and 20', respectively. Each disc brake assembly 20 and 20' comprises a caliper 21 mounted to the front fork or frame 14, respectively, a brake lever 22 mounted to handlebar 18, and a disc brake rotor 23 mounted to its associated hub 12 or 12'. Since the disc brake assemblies 20 and 20' are substantially the same, only the relevant components of disc brake assembly 20 shall be described further.

Figure 4:
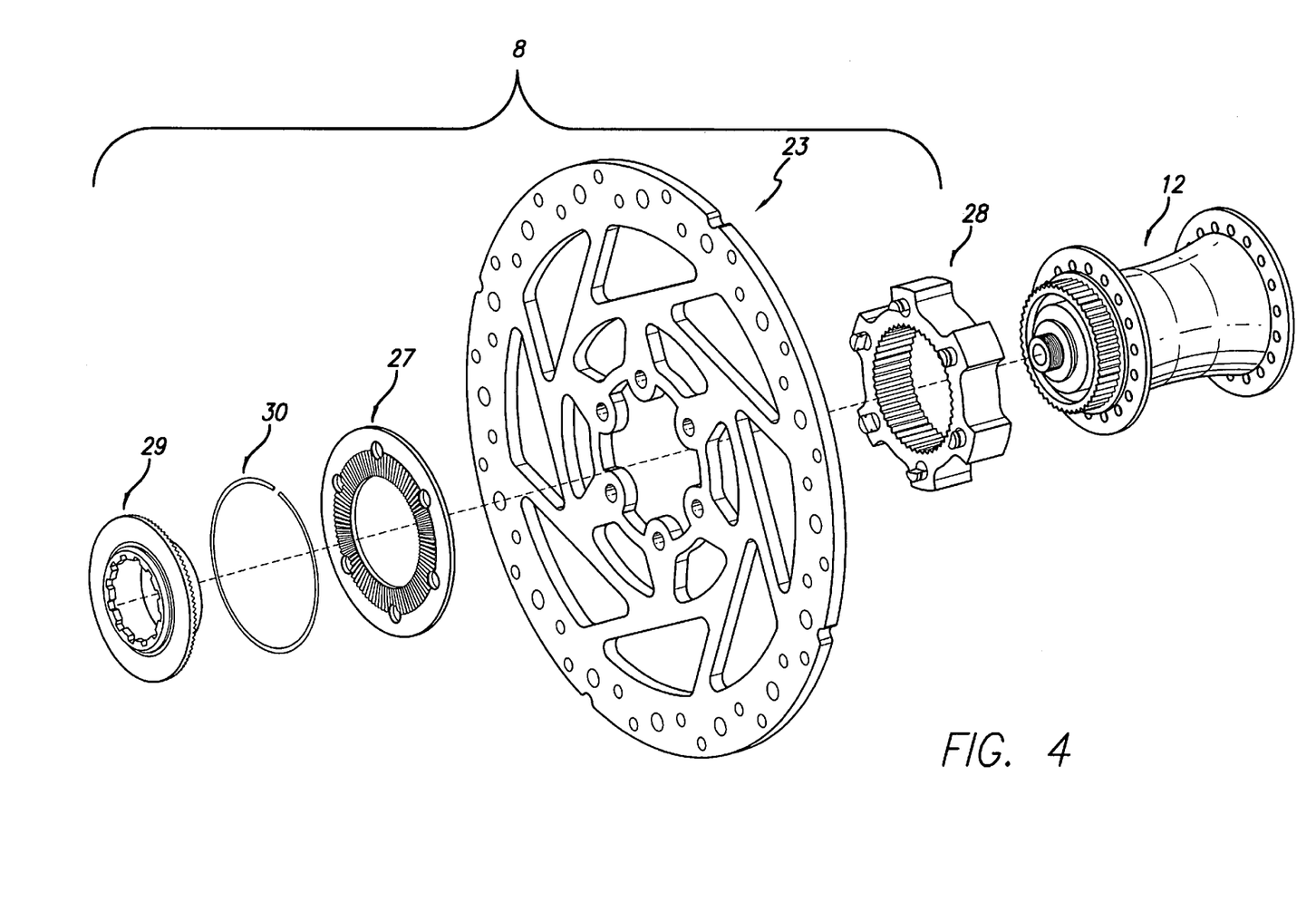
FIG. 4 is an exploded perspective view of a wheel hub and disc brake rotor assembly in accordance with an embodiment of the invention.

FIG. 4 is an exploded view of particular embodiments of disc brake components associated with wheel hub 12. In general, disc (or disk) brake rotor 23 is detachably and nonrotatably connected to disc brake hub 12 using an adapter 28, a fastener in the form of a lock ring 29, a washer 27 and a securing ring or rotor retaining member 30. Disc brake rotor 23, adapter 28, lock ring 29 and rotor retaining member 30 comprise a disc brake rotor assembly 8. As discussed in more detail below, rotor retaining member 30 couples disc brake rotor 23 to adapter 28 without requiring rivets, bolts or tools.

Figure 5:
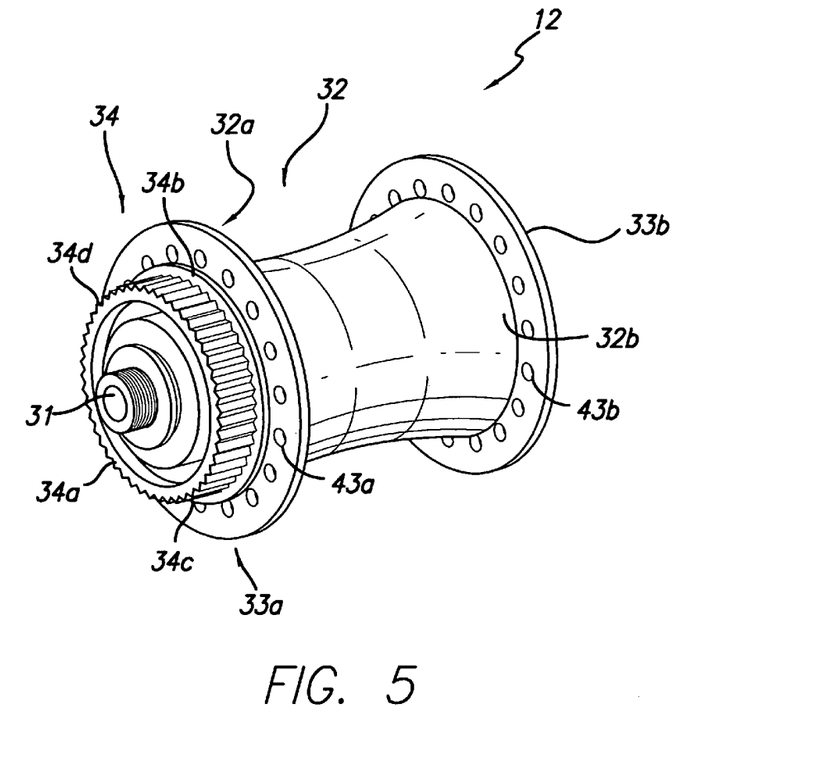
FIG. 5 is a perspective view of the wheel hub of FIG. 4.

Front disc brake hub 12 is nearly identical to the rear disc brake hub 12' except that it lacks a freewheel. As shown in FIG. 5, disc brake hub 12 comprises a hub axle 31, a hub shell 32 rotatably supported on hub axle 31 in a conventional manner, a first spoke connecting flange 33a, a second spoke connecting flange 33b, and a brake rotor attachment unit 34. First and second spoke connecting flanges 33a and 33b and brake rotor attachment unit 34 are formed as a unified part with hub shell 32.

First spoke connecting flange 33a is an annular spoke flange disposed on hub shell 32 at a first hub shell end 32a of hub shell 32. A plurality of first spoke openings 43a are formed circumferentially equidistant in first spoke connecting flange 33a for receiving the curved ends of each of a plurality of the spokes 24. Similarly, second spoke connecting flange 33b is an annular spoke flange disposed on hub shell 32 at a second hub shell end 32b of hub shell 32. A plurality of second spoke openings 43b are formed circumferentially equidistant in second spoke connecting flange 33b for receiving the curved ends of each of another plurality of spokes 24. As a result, the spokes 24 extend radially outwardly in a circumferential manner.

Brake rotor attachment unit 34 is disposed at first hub shell end 32a of hub shell 32 adjacent to first spoke connecting flange 33a. Brake rotor attachment unit 34 comprises a tubular member 34a and an annular adjoining flange 34b extending radially outwardly from tubular member 34a. Tubular member 34a has an outer peripheral surface defining a plurality of male splines 34c and an inner peripheral surface defining a female threaded portion 34d. It will be understood that the brake rotor attachment unit 34 is not a limitation on the present invention, and that any unit for coupling the hub 12 and adapter 28 is within the scope of the present invention.

Figure 6:
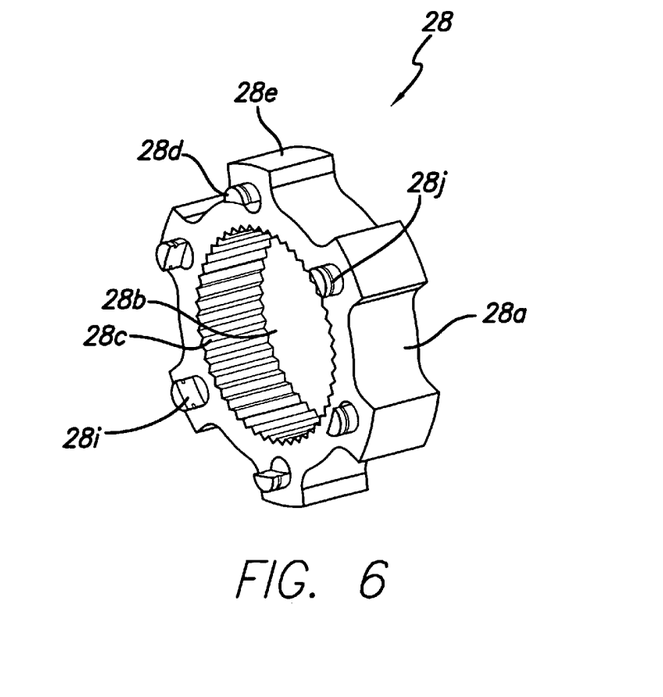
FIG. 6 is a perspective view of the adapter shown in FIG. 4.

As shown in FIG. 6, adapter 28 comprises a main body 28a that is generally annular in shape with a center opening 28b. The inner peripheral surface of center opening 28b defines a plurality of female splines 28c. Splines 28c are adapted to engage the plurality of splines 34c on brake rotor attachment unit 34 of hub 12 so that adapter 28 can be nonrotatably coupled to hub 12. Main body 28a includes a plurality of equally spaced rotor attachment arms 28e. Each rotor attachment arm 28e preferably includes at least one axially extending protruding portion 28d. Adapter 28 is preferably made of a rigid material, such as aluminum.

Figure 7:
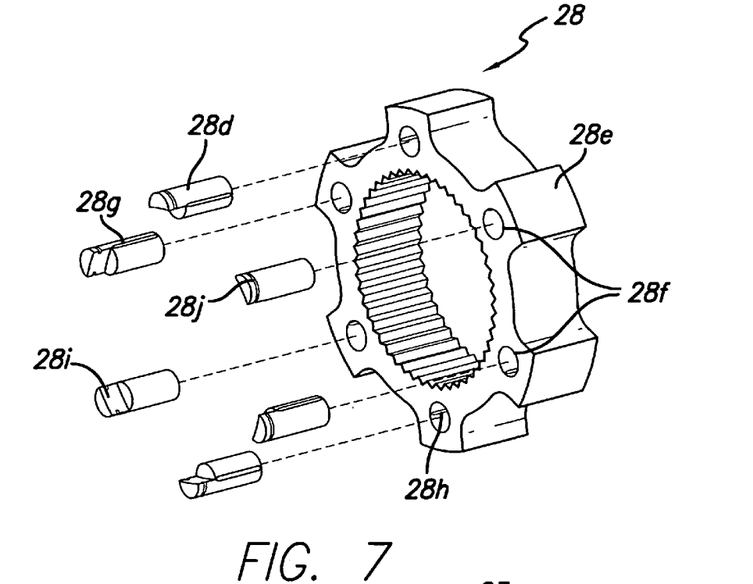
FIG. 7 is a perspective view of the adapter shown in FIG. 4 showing the protruding portions exploded out thereof.
Figures 14, 15, 16:
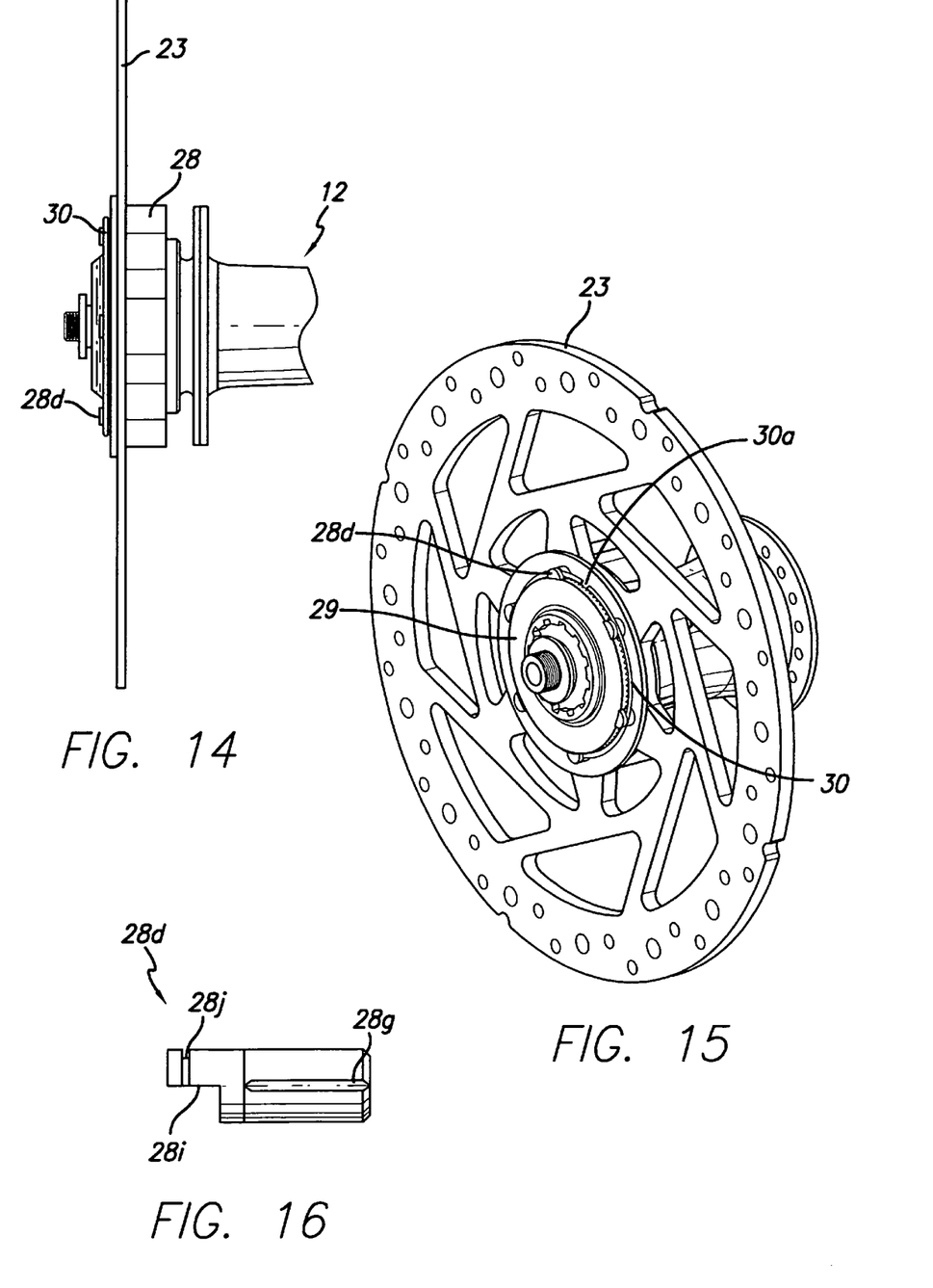
FIG. 14 is a side elevational view of disc brake rotor assembly of FIG. 4 attached to the wheel hub.
FIG. 15 is a perspective view of the disc brake rotor assembly of FIG. 4 attached to the wheel hub.
FIG. 16 is a side elevational view of the protruding portion of FIG. 4.

As shown in FIG. 7, in a preferred embodiment, adapter 28 has a plurality of openings 28f defined therein for receiving the protruding portions 28d. The openings 28f each include a key 28g extending axially that couples with a corresponding keyway 28h defined in each of the protruding portions 28d. The protruding portions 28d preferably each include a stepped portion 28i and have a groove 28j defined therein, as best shown in FIG. 16. During manufacturing the protruding portions 28d are press fit into the openings 28f and the key and keyway arrangement prevents the protruding portions 28d from rotating within the opening 28f.

In another embodiment, the protruding portions 28d can be formed as a unit with the remainder of the adapter 28. For example, it can be machined as a single piece. In yet another embodiment, the protruding portions 28d may be welded to the main body 28a. Other ways of forming protruding portions on the main body portion will be readily apparent to those skilled in the art.

Figure 8:
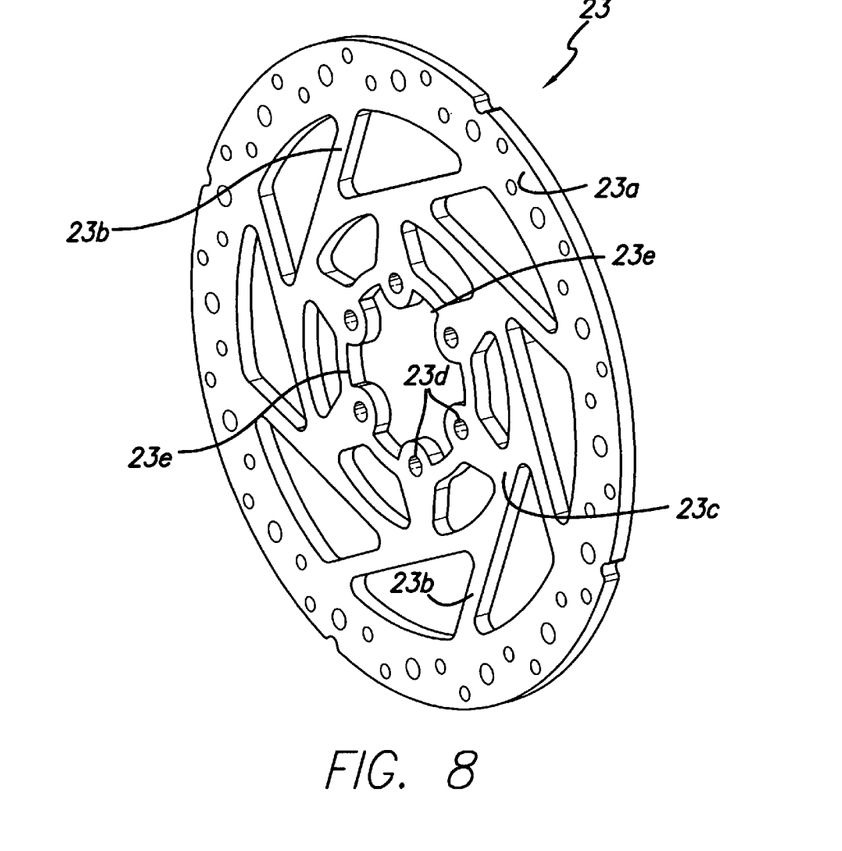
FIG. 8 is a perspective view of the disc brake rotor shown in FIG. 4.

As shown in FIG. 8, disc brake rotor 23 comprises a braking ring 23a formed with a plurality of openings, a plurality of (e.g., eight) connecting arms 23b disposed circumferentially equidistant and extending radially inwardly from braking ring 23a, and an inner attachment unit 23c connected tangentially to the inner ends of the plurality of connecting arms 23b so that the plurality of connecting arms 23b form a plurality of triangular openings. In this embodiment, braking ring 23a, the plurality of connecting arms 23b and inner attachment unit 23c are one piece. Disc brake rotor 23 preferably is made from stainless steel or some other appropriate material, usually with a specific gravity greater than that of the material forming adapter 28, that can withstand braking forces.

Inner attachment unit 23c comprises a plurality of circumferentially equidistant connection openings 23d, preferably one per protruding portion 28d on adapter 28, a plurality of (e.g., six) circumferentially equidistant connection notches 23e. Each protruding portion 28d in adapter 28 engages a corresponding connection opening 23d in inner attachment unit 23c so that disc brake rotor 23 may be nonrotatably attached to adapter 28. The axial length of each protruding portion 28d is preferably long enough to extend through the connection opening 28d so that groove 28j is on the opposite side of disc brake rotor 28 that main body 28a of adapter 28 is. It will be understood that modifications can be made to disc brake rotor 23 and that the components making up disc brake rotor 23 are not a limitation on the present invention. For example, except for the inclusion of insertion openings 23d and the center opening, disc brake rotor 23 could be solid.

Figure 9:
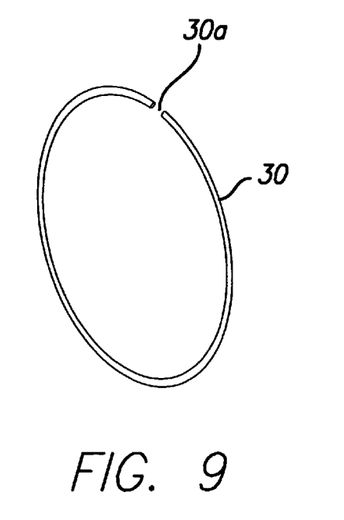
FIG. 9 is a perspective view of the rotor retaining member in FIG. 4.

As shown in FIG. 9, rotor retaining member 30 is generally annular or ring shaped. Preferably, rotor retaining member 30 comprises an elongated piece of metal or wire that is formed into a ring and includes a gap 30a between the opposite ends of the wire. The gap 30a allows the rotor retaining member 30 to be elastically deformable and sized so that it can fit into the grooves 28j in the protruding portions 28d. The rotor retaining member 30 does not have to be made of metal. Any substantially ring shaped member that can engage the protrusive portions 28d (preferably by fitting into the grooves 28j) is within the scope of the present invention. For example, rotor retaining member 30 could be a rubber or plastic band.

Figure 10:
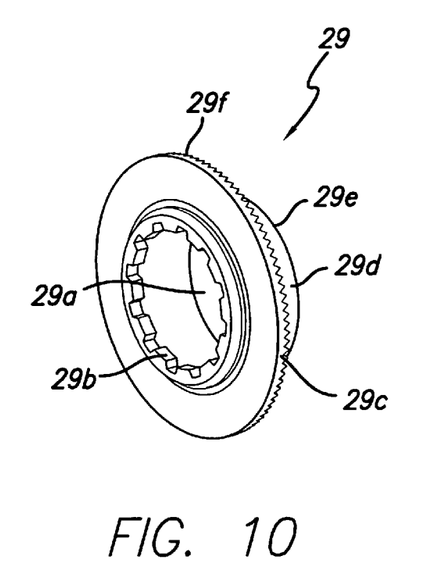
FIG. 10 is a perspective view of the lock ring shown in FIG. 4.

As shown in FIG. 10, lock ring 29 comprises an annular flange 29c and a tubular portion 29d that extends axially from the inner peripheral surface of flange 29c. Flange 29c includes a central opening 29a partially defined by a plurality of female splines 29b that are adapted to engage an assembly tool (not shown). Tubular portion 29d includes a male threaded portion 29e structured to engage the female threaded portion 34d on brake rotor attachment unit 34 of hub 12. Side face of flange 29c includes a rotation inhibiting structure, which is preferably a plurality of serrations or ridges 29f that are adapted to engage a plurality of corresponding ridges 27a on a side face of washer 27. Thus, when lock ring 29 is screwed into brake rotor attachment unit 34, the side face of flange 29c presses against washer 27, thereby causing the ridges 27a and 29f to engage one another. This arrangement prevents the washer 27 and lock ring 29 from rotating relative to one another.

Figure 11:
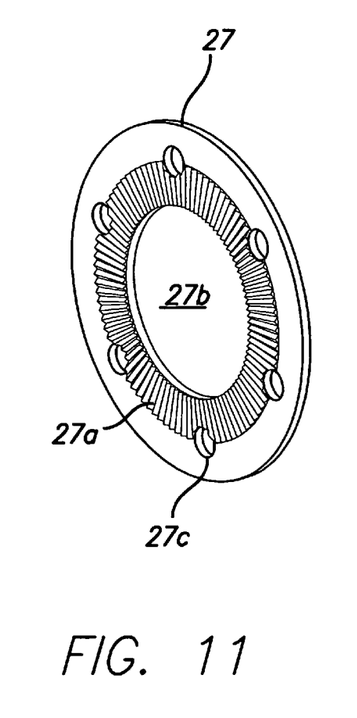
FIG. 11 is a perspective view of the washer shown in FIG. 4.
Figure 12:
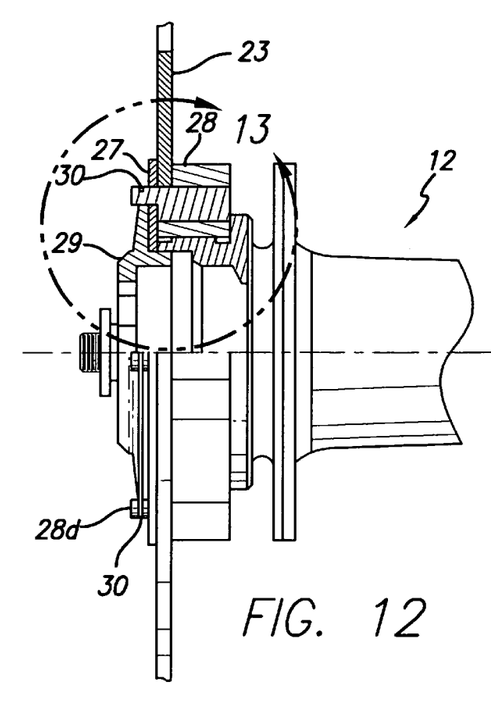
FIG. 12 is an elevational view, with a portion in cross-section, of the disc brake rotor assembly of FIG. 4 attached to the wheel hub.

As shown in FIG. 11, washer 27 includes a central opening 27b, ridges 27a (as described above) and a plurality of washer connection openings 27c defined therethrough. The washer connection openings 27c correspond to the connection openings 23d in the disc brake rotor 23 and the protruding portions 28d on the adapter 28.

Figure 13:
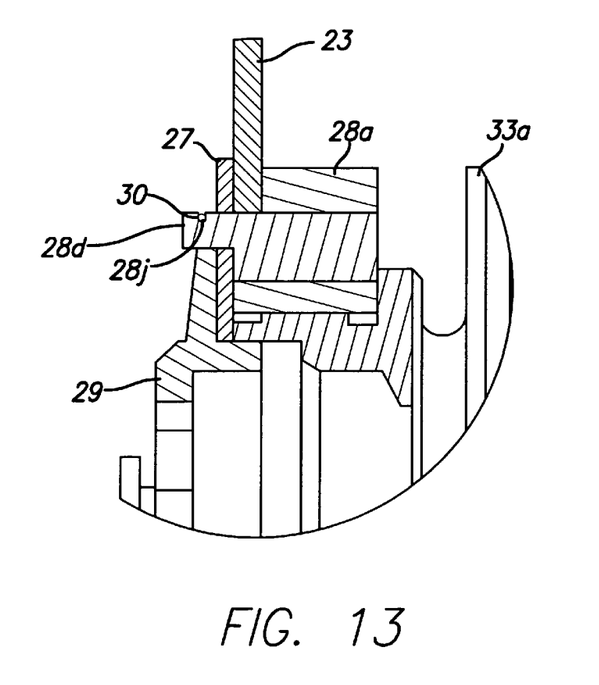
FIG. 13 is a more detailed view showing the attachment of the disc brake rotor assembly of FIG. 4 to the adapter.

FIGS. 12-15 show the disc brake rotor assembly 8 attached to hub 12. FIG. 13 is a detailed view showing how rotor retaining member 30 retains disc brake rotor 23 to adapter 28. Initially, adapter 28 is mounted to brake rotor attachment unit 34 of hub 12 by engaging the male splines 34c on brake rotor attachment unit 34 with the female splines 28c on adapter 28. Then, disc brake rotor 23 is placed on adapter 28 by engaging protruding portions 28d of adapter 28 with the corresponding connection openings 23d in disc brake rotor 23. Washer 27 is then also placed on adapter 28 by engaging protruding portions 28d of adapter 28 with the corresponding washer connection openings 27c.

Rotor retaining member 30 is then engaged with protruding portions 28d. Preferably, this is done by elastically deforming the rotor retaining member 30 and placing portions of the rotor retaining member 30 into each of the grooves 28j in the protruding portions 28d, as shown in FIG. 15. In a preferred embodiment, rotor retaining member 30 is elastically deformable because gap 30a prevents rotor retaining member 30 from forming a complete ring. This allows rotor retaining member 30 to be deformable radially outwardly by pulling the opposite ends of the ring apart at the gap 30a. Because of the elastic qualities of the material from which the rotor retaining member 30 is made, it snaps back into place once placed in the grooves 28j and released. As a result, disc brake rotor 23 is retained to adapter 28 simply by elastically deforming rotor retaining member 30 and placing portions of it into the grooves 28j in the protruding portions 28d of the adapter 28. Attaching and tightening bolts are not required, thus greatly simplifying the manufacturing operation and enhancing production efficiency.

Finally, lock ring 29 is screwed into the female threaded portion 34d of brake rotor attachment unit 34 of hub 12 to tightly secure disc brake rotor assembly 8 to hub 12. As discussed above, when lock ring 29 is screwed on, the ridges 29f thereon engage the ridges on the washer 27. In an alternative embodiment the washer can be omitted and the ridges can be defined in the disc brake rotor or the ridges can be omitted altogether. The disc brake rotor 23, sandwiched between adapter 28 and washer 27 and lock ring 29 to form a strong connection, is thereby secured in a non-rotatable state to the brake rotor attachment unit 34 of hub 12.

When one desires to disassemble disc brake rotor assembly 8, lock ring 29 is unscrewed from the female threaded portion 34d of brake rotor attachment unit 34 of hub 12. Then, the rotor retaining member 30 is elastically deformed by pulling the opposite ends of the ring apart at the gap 30a, such that the rotor retaining member 30 is disengaged from the grooves 28j. Washer 27 and disc brake rotor 23 may then be removed from adapter 28, and adapter 28 may be removed from brake rotor attachment unit 34 of hub 12.

Figure 17:
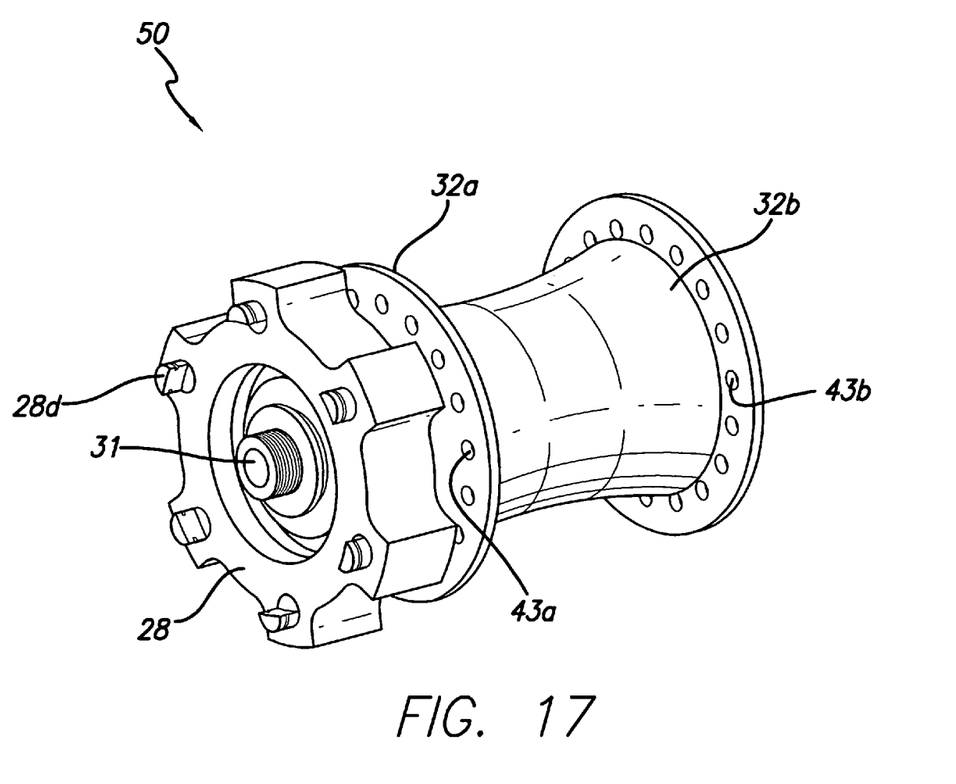
FIG. 17 is a perspective view of another embodiment of the present invention where the hub and adapter are formed as a unit.

FIG. 17 shows another preferred embodiment of the present invention. In this embodiment, the adapter 28 and hub 50 are formed as an integral unit. This embodiment is similar to the embodiment described above, except that the brake rotor attachment unit 24 and its associated components are omitted because the adapter 28 is already part of the hub 50. The remainder of the components of the disc brake rotor assembly 8 (the lock ring 29, rotor retaining member 30 and washer 27) are assembled with the adapter 28 in the same manner as described above. However, the step of having to couple the adapter to the hub is omitted. This simplifies production and allows for a reduction in the number of separate components necessary to assembly the hub 50 and disc brake rotor assembly 8.

While the above is a description of various embodiments of inventive features, further modifications may be employed without departing from the spirit and scope of the present invention. For example, lock ring 29 and/or washer 27 may be omitted in some applications. The teachings herein could be applied to one or both of hubs 12 and 12'.

The size, shape, location or orientation of the various components may be changed as desired. Components that are shown directly connected or contacting each other may have intermediate structures disposed between them. Those features that are designated as preferable certainly are not necessary. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. An apparatus for coupling a bicycle disc brake rotor to a bicycle wheel hub, wherein the apparatus comprises:

a) an adapter adapted to be nonrotatably coupled to the bicycle wheel hub, wherein the adapter includes a main body having opposing first and second faces and a plurality of axially extending protruding portions that extend from the second face, wherein each of the protruding portions includes a step portion having an inner surface facing radially inwardly and an outer surface facing radially outwardly, wherein the outer surface has a groove defined therein, b) a bicycle disc brake rotor having a central opening and a plurality of radially arranged openings defined therein, wherein the axially extending protruding portions extend through the radially arranged openings in the disc brake rotor to nonrotatably couple the disc brake rotor to the adapter, wherein the disc brake rotor is positioned adjacent the second face of the main body of the adapter, c) a rotor retaining member, wherein a portion of the rotor retaining member is received in the grooves in the protruding portions, and
d) a lock ring having a central opening and a rotation inhibiting structure on an inner surface thereof for preventing rotation of the lock ring relative to the disc brake rotor, wherein the inner surfaces of the step portions of the protruding portions cooperate to define a space, wherein the lock ring is sized to fit in the space such that an outer circumferential surface of the lock ring is positioned adjacent the inner surfaces of the step portions.

2. The apparatus of claim 1 wherein the rotor retaining member secures the disc brake rotor between the rotor retaining member and the main body of the adapter.

3. The apparatus of claim 1 wherein the adapter includes an inner surface that defines an axially aligned opening, and wherein the inner surface includes a plurality of splines.

4. An apparatus for coupling a bicycle disc brake rotor having a plurality of openings defined therein to a bicycle wheel hub, wherein the apparatus comprises:
  a) an adapter that includes a plurality of axially extending protrusions adapted to extend through the openings in the disc brake rotor, wherein each of the protruding portions includes a step portion having an inner surface facing radially inwardly and an outer surface facing radially outwardly, wherein the outer surface has a groove defined therein, and
  b) an annularly shaped rotor retaining member, wherein the rotor retaining member engages the groove in each of the protrusions to couple the disc brake rotor to the adapter,
  c) a lock ring having a central opening and a rotation inhibiting structure on an inner surface thereof for preventing rotation of the lock ring relative to the disc brake rotor, wherein the inner surfaces of the step portions of the protruding portions cooperate to define a space, wherein the lock ring is sized to fit in the space such that an outer circumferential surface of the lock ring is positioned adjacent the inner surfaces of the step portions.

5. The apparatus of claim 4 wherein the rotor retaining member is elastically deformable.

6. The apparatus of claim 4 wherein the protrusions are secured in openings defined in the adapter.

7. An apparatus for coupling a bicycle disc brake rotor to a bicycle wheel hub, wherein the apparatus comprises:
  a) an adapter formed integrally with the hub, wherein the adapter includes a main body having opposing first and second faces and a plurality of axially extending protruding portions that extend from the second face, wherein each of the protruding portions includes a groove defined therein, wherein the grooves are arranged radially outwardly,
  b) a bicycle disc brake rotor having a central opening and a plurality of radially arranged openings defined therein, wherein the axially extending protruding portions extend through the radially arranged openings in the disc brake rotor to nonrotatably couple the disc brake rotor to the adapter, wherein the disc brake rotor is positioned adjacent the second face of the main body of the adapter, and
  c) a rotor retaining member, wherein a portion of the rotor retaining member is received in each of the grooves in the protruding portions,
  d) a lock ring having a central opening and a rotation inhibiting structure on an inner surface thereof for preventing rotation of the lock ring relative to the disc brake rotor, and
  e) a washer having opposing first and second faces, a central opening and a plurality of radially arranged openings defined therethrough that correspond to the radially arranged openings in the disc brake rotor, wherein the first face is positioned adjacent the disc brake rotor and wherein the protruding portions extend through the radially arranged openings in the washer, and wherein the rotor retaining member retains the washer and disc brake rotor on the protruding portions.

8. The apparatus of claim 7 wherein the rotor retaining member secures the disc brake rotor between the rotor retaining member and the main body of the adapter.

9. An apparatus for coupling a bicycle disc brake rotor to a bicycle wheel hub, wherein the apparatus comprises:
  a) an adapter adapted to be nonrotatably coupled to the bicycle wheel hub, wherein the adapter includes a main body having opposing first and second faces and a plurality of axially extending protruding portions that extend from the second face, wherein each of the protruding portions includes a step portion having an inner surface facing radially inwardly and an outer surface facing radially outwardly, wherein the outer surface has a groove defined therein,
  b) a bicycle disc brake rotor having a central opening and a plurality of radially arranged openings defined therein, wherein the axial extending protruding portions extend through the radially arranged openings in the disc brake rotor to nonrotatably couple the disc brake rotor to the adapter, wherein the disc brake rotor is positioned adjacent the second face of the main body of the adapter,
  c) a rotor retaining member, wherein a portion of the rotor retaining member is received in the grooves in the protruding portions,
  d) a lock ring having a central opening and a rotation inhibiting structure on an inner surface thereof for preventing rotation of the lock ring relative to the disc brake rotor, and
  e) a washer having opposing first and second faces, a central opening and a plurality of radially arranged openings defined therethrough that correspond to the radially arranged openings in the disc brake rotor, wherein the first face is positioned adjacent the disc brake rotor and wherein the protruding portions extend through the radially arranged openings in the washer, and wherein the rotor retaining member retains the washer and disc brake rotor on the protruding portions.

10. The apparatus of claim 9 wherein the washer includes a rotation inhibiting structure on the second face thereof, wherein the rotation inhibiting structure on the lock ring engages the rotation inhibiting structure on the washer, thereby preventing rotation of the lock ring relative to the washer.

11. The apparatus of claim 10 wherein the lock ring includes an annular flange and a tubular portion extending axially from an inner surface of the annular flange, wherein the rotation inhibiting structure is positioned on the inner surface of the annular flange, and wherein the tubular portion extends through the central openings in the washer and disc brake rotor.

12. The apparatus of claim 10 wherein the rotation inhibiting structure on the lock ring comprises a plurality of ridges and the rotation inhibiting structure on the washer comprises a plurality of ridges that correspond to the plurality of ridges on the lock ring.

* * * * *